(12) United States Patent
Hiraki

(10) Patent No.: US 10,341,479 B2
(45) Date of Patent: Jul. 2, 2019

(54) SEQUENTIAL NOTIFICATION DATA OUTPUT CONTROL APPARATUS, SYSTEM AND COMPUTER READABLE STORAGE MEDIUM

(71) Applicant: EIZO Corporation, Ishikawa (JP)

(72) Inventor: Kenji Hiraki, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/981,899

(22) Filed: May 17, 2018

(65) Prior Publication Data

US 2018/0270342 A1 Sep. 20, 2018

Related U.S. Application Data

(63) Continuation of application No. PCT/JP2015/082471, filed on Nov. 18, 2015.

(51) Int. Cl.
*H04B 1/38* (2015.01)
*H04M 1/725* (2006.01)
(Continued)

(52) U.S. Cl.
CPC .......... *H04M 1/72527* (2013.01); *G06F 3/14* (2013.01); *G06F 13/00* (2013.01); *H04M 1/7253* (2013.01);
(Continued)

(58) Field of Classification Search
CPC ......... H04M 1/72527; H04M 1/72597; H04M 1/72547
(Continued)

(56) References Cited

U.S. PATENT DOCUMENTS 8,614,968 B1 12/2013 Cody
2008/0220752 A1 9/2008 Forstall
(Continued)

FOREIGN PATENT DOCUMENTS

JP 2004070701 A 3/2004
JP 2013021442 A 1/2013
WO WO2012157328 A1 11/2012

OTHER PUBLICATIONS

Extended European Search Report issued for European Patent Application No. 15908759.2, issued by the European Patent Office dated Aug. 1, 2018.
(Continued)

*Primary Examiner* — Kathy W Wang-Hurst
*Assistant Examiner* — B M M Hannan

(57) ABSTRACT

It is desirable to be able to more appropriately notify a user of a display apparatus of the state of a mobile phone. In view of this, an output control apparatus is provided, the output control apparatus including: an information receiving unit that receives information from a communication device; a notification data storage unit that stores notification data associated with the information from the communication device; a notification data output unit that outputs the notification data corresponding to the information received by the information receiving unit; and an output control unit that makes different output control for the notification data corresponding to the received information, depending on whether or not an output queue count for the notification data corresponding to the received information is smaller than a predetermined number when the information receiving unit receives the information.

8 Claims, 10 Drawing Sheets

(51) Int. Cl.
*G06F 3/14* (2006.01)
*G06F 13/00* (2006.01)

(52) U.S. Cl.
CPC ... *H04M 1/72547* (2013.01); *H04M 1/72597* (2013.01); *H04M 1/72519* (2013.01); *H04M 1/72552* (2013.01); *H04M 2250/16* (2013.01)

(58) Field of Classification Search
USPC .......................................................... 455/557
See application file for complete search history.

(56) References Cited

U.S. PATENT DOCUMENTS

| | | | | |
|---|---|---|---|---|
| 2013/0010195 A1* | 1/2013 | Daioku | .................. | H04N 5/775 348/552 |
| 2015/0280933 A1* | 10/2015 | Choi | ....................... | H04W 4/16 709/217 |
| 2015/0381791 A1* | 12/2015 | Yu | ........................ | H04L 12/2827 455/557 |
| 2016/0035311 A1 | 2/2016 | Ryo | | |

OTHER PUBLICATIONS

International Search Report for International Patent Application No. PCT/JP20151082471, issued by the Japan Patent Office dated Feb. 9, 2016.

\* cited by examiner

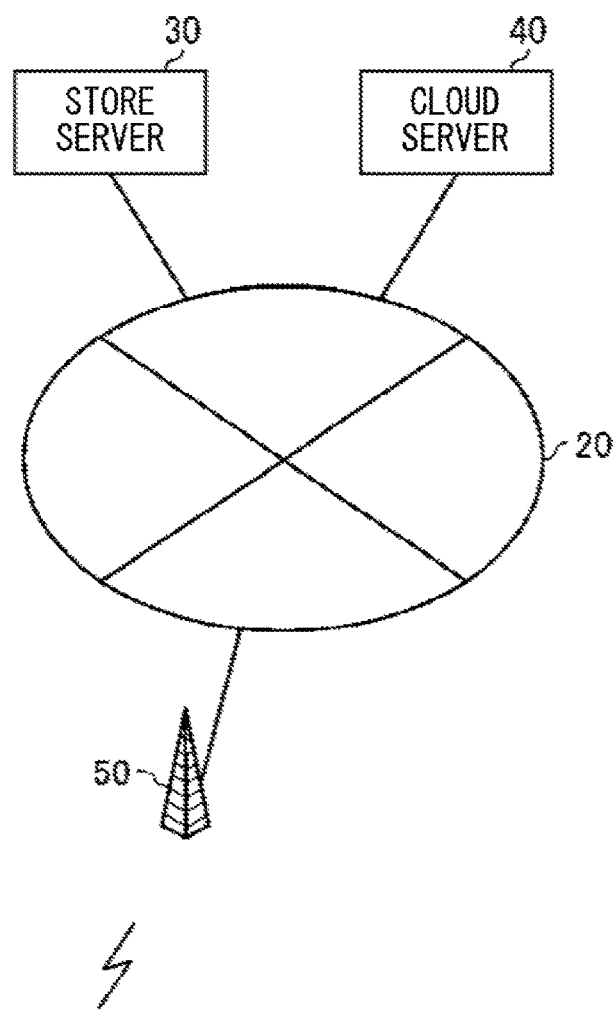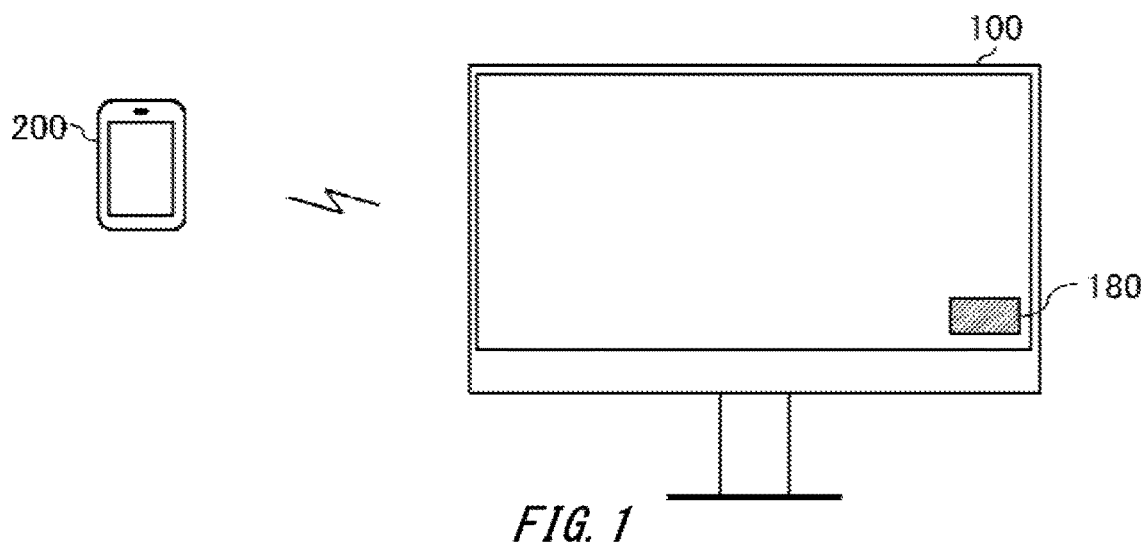
FIG. 1

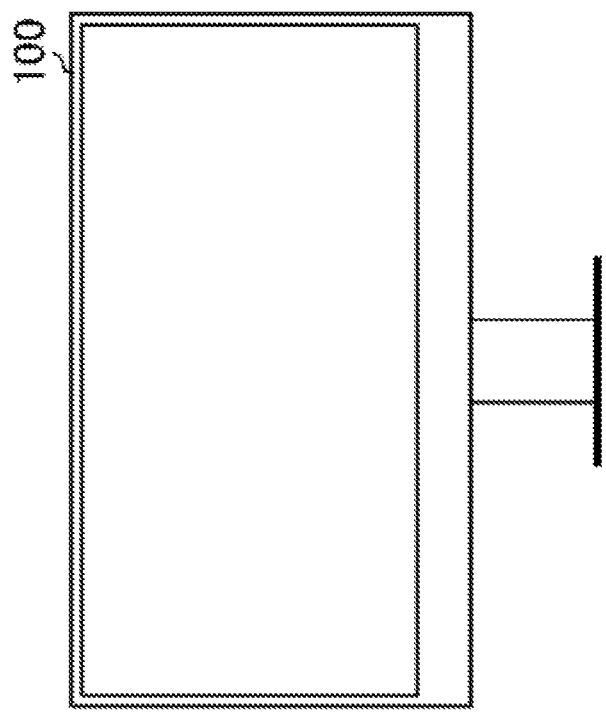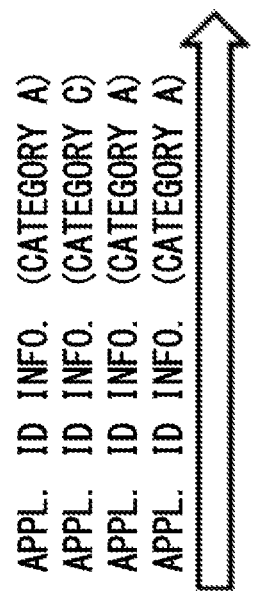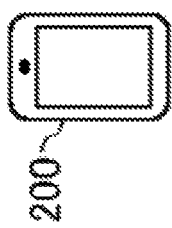
FIG. 2

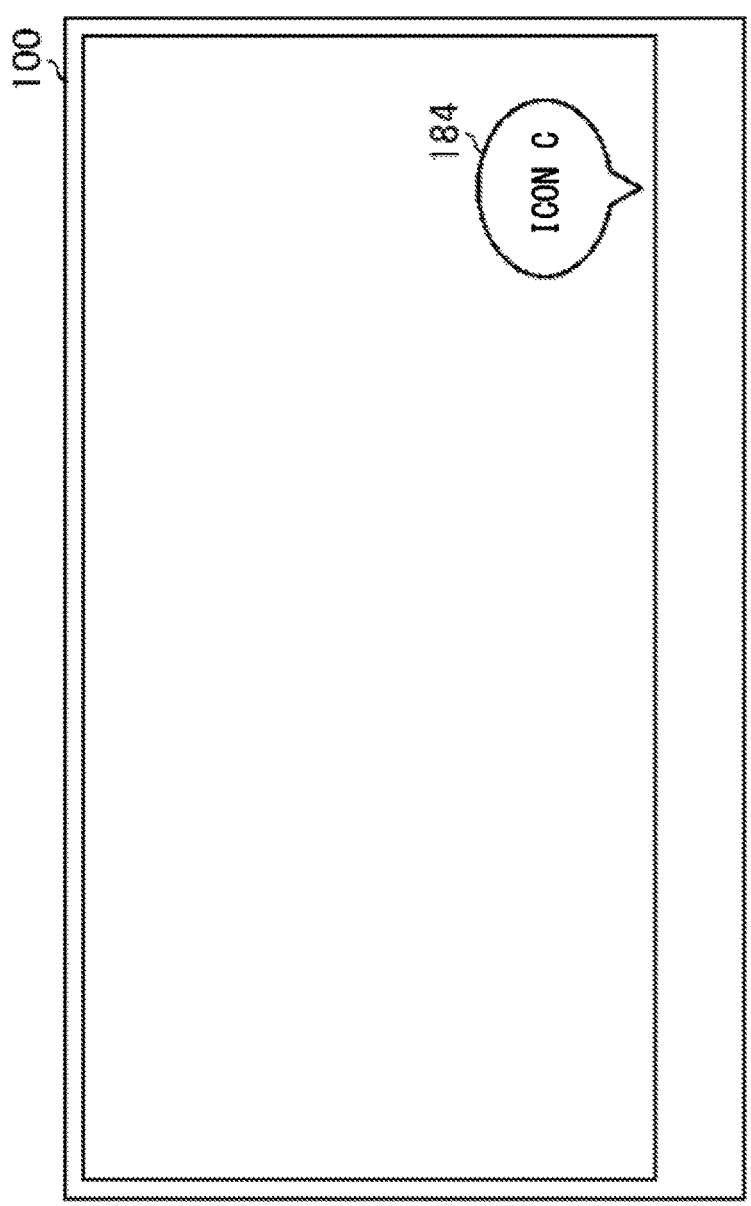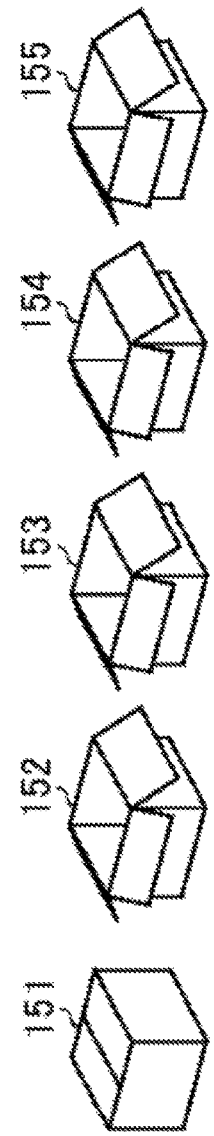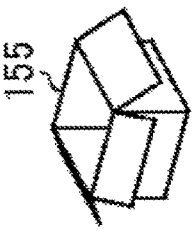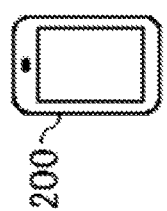
FIG. 7

SEQUENTIAL NOTIFICATION DATA OUTPUT CONTROL APPARATUS, SYSTEM AND COMPUTER READABLE STORAGE MEDIUM

The contents of the following patent application are incorporated herein by reference:
No. PCT/JP2015/082471 filed on Nov. 18, 2015

BACKGROUND

1. Technical Field

The present invention relates to an output control apparatus, system and computer readable storage medium.

2. Related Art

An image display apparatus is known including a control unit for displaying a notification that a mobile phone connected to an HDMI (registered trademark) port of the image display apparatus has received an incoming call when the mobile phone received such a call. (please see Patent Document 1, for example).

PRIOR ART DOCUMENT

Patent Document

[Patent Document 1] Japanese Patent Application Publication No. 2013-021442

It is desirable to be able to more appropriately notify a user of a display apparatus of the state of a mobile phone.

BRIEF DESCRIPTION OF THE DRAWINGS

FIG. 1 schematically shows one example of a system 10.
FIG. 2 schematically shows one example of the flow of processes performed by the system 10.
FIG. 7 schematically shows one example of the flow of processes performed by the system 10.

DESCRIPTION OF EXEMPLARY EMBODIMENTS

Figure 3:
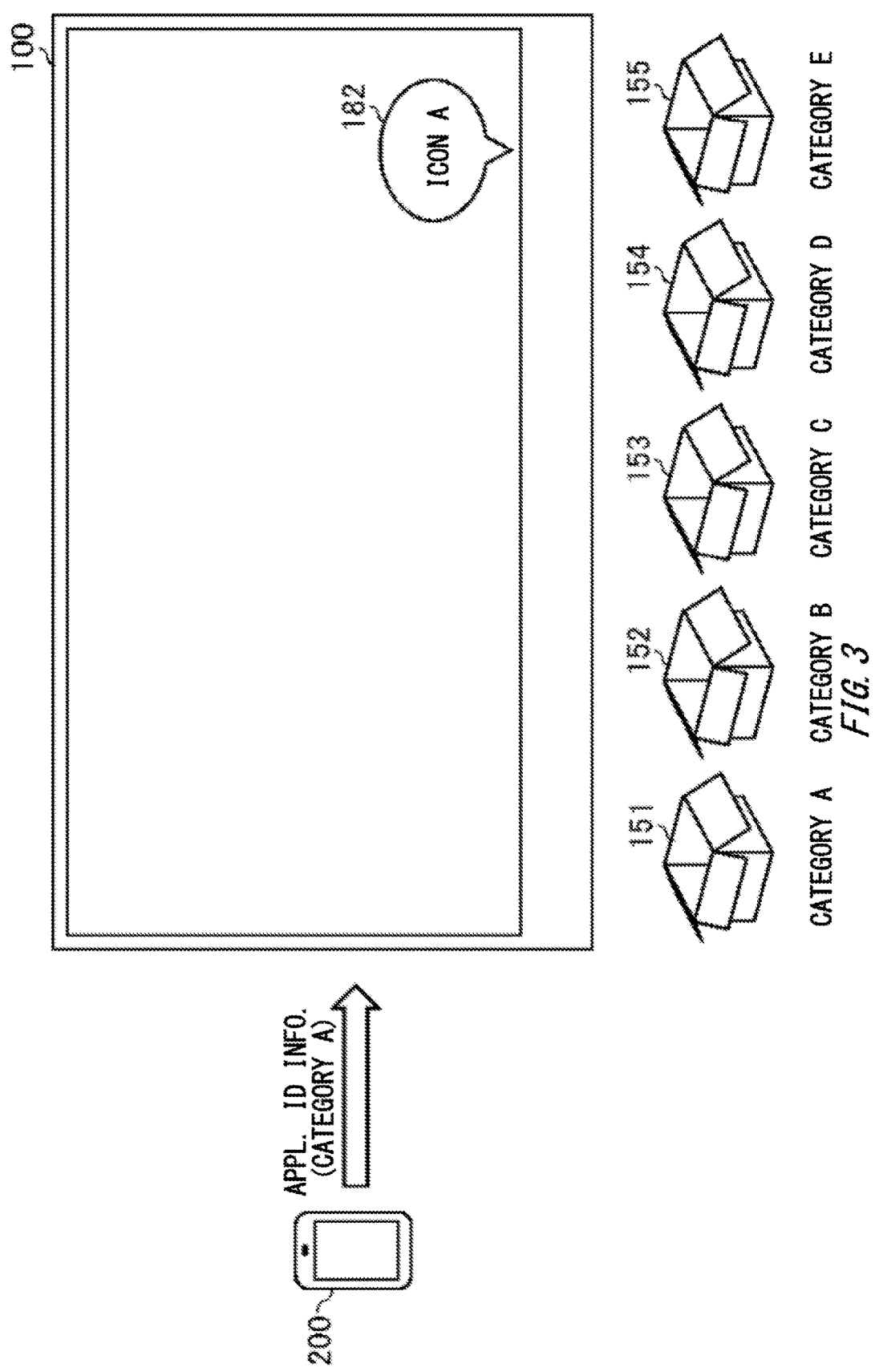
FIG. 3 schematically shows one example of the flow of processes performed by the system 10.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

FIG. 1 schematically shows one example of a system 10. The system 10 includes a display apparatus 100 and a mobile terminal 200. The display apparatus 100 may be one example of an output control apparatus. The mobile terminal 200 may be one example of a communication device.

Upon occurrence, at the mobile terminal 200 which has established wireless communication connection, of events of various types of applications such as reception of phone calls, reception of mails, reception of messages from SNSs (Social Network Services) or reception of messages about games, the display apparatus 100 according to the present embodiment outputs notification data, such as an icon 180, that corresponds to the events and is for notifying the occurrence of the events, and notifies a user of the display apparatus 100 of the occurrence of the events.

The display apparatus 100 may have previously stored default icons (which are in some cases called standard icons). The display apparatus 100 may store a plurality of standard icons. For example, the display apparatus 100 stores five standard icons.

The display apparatus 100 may store combinations of mobile terminal identification information of the mobile terminal 200 and application identification information in association with the standard icons. The mobile terminal identification information may be any information as long as it allows identification of the mobile terminal 200. For example, the mobile terminal identification information is pairing information for BLE (Bluetooth (registered trademark) Low Energy) communication connection. Also, the mobile terminal identification information may be pairing information for Bluetooth (registered trademark) communication connection, phone numbers, individual identification information, terminal identification numbers, MAC (Media Access Control address) numbers or the like. The application identification information may be any information as long as it allows identification of applications. For example, the application identification information is the package names of applications.

Also, the display apparatus 100 may have an icon purchased from a store server 30 using the mobile terminal 200 (which is in some case called a special icon). The display apparatus 100 receives and stores the special icon from the mobile terminal 200 via BLE communication connection, for example. The display apparatus 100 may store a plurality of special icons. For example, the display apparatus 100 stores five special icons. The display apparatus 100 may store combinations of mobile terminal identification information of the mobile terminal 200 and application identification information in association with the special icons.

The mobile terminal 200 transmits, to the display apparatus 100, application identification information about an application in which an event occurred. The application identification information is one example of information that the display apparatus 100 receives from the mobile terminal 200. If a combination of application identification information and mobile terminal identification information of the mobile terminal 200 received from the mobile terminal 200 is stored in association with a special icon, the display apparatus 100 displays the special icon. Also, if a combination of application identification information and mobile terminal identification information of the mobile terminal 200 received from the mobile terminal 200 is not stored in association with a special icon, but is stored in association with a standard icon, the display apparatus 100 displays the standard icon. If a combination of application identification information and mobile terminal identification information of the mobile terminal 200 received from the mobile terminal 200 is not stored in association with any of special icons and standard icons, the display apparatus 100 may display a preset standard icon among a plurality of standard icons.

Via a radio base station 50 and a network 20, the mobile terminal 200 may access the store server 30 selling icons. The mobile terminal 200 and the radio base station 50 may be in wireless communication using any communication method. For example, the mobile terminal 200 and the radio base station 50 communicate wirelessly using a 2G (2nd Generation) communication method such as GSM (registered trademark) (Global System for Mobile communications) or PDC (Personal Digital Cellular), a 3G (3rd Generation) communication method such as WCDMA (registered trademark) (Wideband Code Division Multiple Access) or CDMA 2000 (Code Division Multiple Access 2000), a 3.9 G communication method such as LTE (Long Term Evolution), a 4G communication method such as Advanced LTE, or a communication method which is newer than the 4G communication methods. The network 20 may include the Internet and a telephone network. The mobile terminal 200 may access the store server 30 via a Wi-Fi (registered trademark) (Wireless Fidelity) access point and the network 20.

The mobile terminal 200 may receive an icon from a cloud server 40 after completion of a procedure to purchase the icon with the store server 30. The display apparatus 100 may receive, from the mobile terminal 200, an icon that the mobile terminal 200 received from the cloud server 40. Also, the display apparatus 100 may receive an icon from the cloud server 40 after completion of a procedure to purchase the icon by the mobile terminal 200 with the store server 30.

A plurality of icons stored in the display apparatus 100 are associated, by a user of the system 10, with categories of applications installed on the mobile terminal 200. For example, five icons are associated with five categories which are Phone, Mail, SNS, Game and Others. The categories may be one example of the types of application identification information. For example, the category type of application identification information about each of the plurality of mailing applications is Category: Mail, and the category type of application identification information about each of the plurality of SNS applications is Category: SNS.

The display apparatus 100 associates application identification information of an SNS application with a standard icon corresponding to SNS for example based on an instruction from a user of the system 10. Then, the display apparatus 100 displays the standard icon corresponding to SNS when application identification information of the SNS application is received from the mobile terminal 200. Thereby, a user of the system 10 notices that a notification event occurred in the SNS application installed on the mobile terminal 200.

When having established wireless communication connection with the display apparatus 100 while a notification event is occurring, the mobile terminal 200 transmits, to the display apparatus 100, application identification information about the application in which the notification event is occurring. Here, when the mobile terminal 200 and the display apparatus 100 establish wireless communication connection while a plurality of notification events are occurring in one or more applications in the mobile terminal 200, this results in a plurality of pieces of application identification information being transmitted from the mobile terminal 200 to the display apparatus 100 consecutively. For example, if a user who tends to not immediately check notification events occurring in the mobile terminal 200 outdoors, leaving them unchecked, comes home and wirelessly connects the mobile terminal 200 to the display apparatus 100, this results in a large amount of application identification information being transmitted to the display apparatus 100.

In such a case, icons corresponding to all the pieces of the application identification information are sequentially displayed, and it takes time to display all the icons. For example, it may be possible to control so as not to display an icon corresponding to application identification information which is received while another icon is being displayed. In this case, however, occurrence of a notification event which is important to a user might not be able to be notified to the user. In order to solve such a drawback, the display apparatus 100 according to the present embodiment executes a process such that an icon corresponding to the same category is not displayed more than the number of times necessary.

FIG. 2 to FIG. 7 schematically show one example of the flow of processes performed by the system 10. Here, in the example explained with reference to FIG. 2, application identification information corresponding to Category A, application identification information corresponding to Category C, application identification information corresponding to Category A and application identification information corresponding to Category A are transmitted from the mobile terminal 200 to the display apparatus 100 consecutively.

For each category, the display apparatus 100 according to the present embodiment may have a queue that can store an output request to output an icon, as schematically shown in FIG. 3 to FIG. 7. FIG. 3 to FIG. 7 exemplify a case where the display apparatus 100 has five queues 151, 152, 153, 154, 155. The queue 151 corresponds to Category A, the queue 152 corresponds to Category B, the queue 153 corresponds to Category C, the queue 154 corresponds to Category D and the queue 155 corresponds to Category E. Here, in this example explained, each of the queues 151, 152, 153, 154, 155 can store only one output request.

FIG. 3 exemplifies a process performed when the display apparatus 100 receives first application identification information corresponding to Category A. Since no icons are displayed yet, the display apparatus 100 displays an icon 182 corresponding to Category A.

Figure 4:
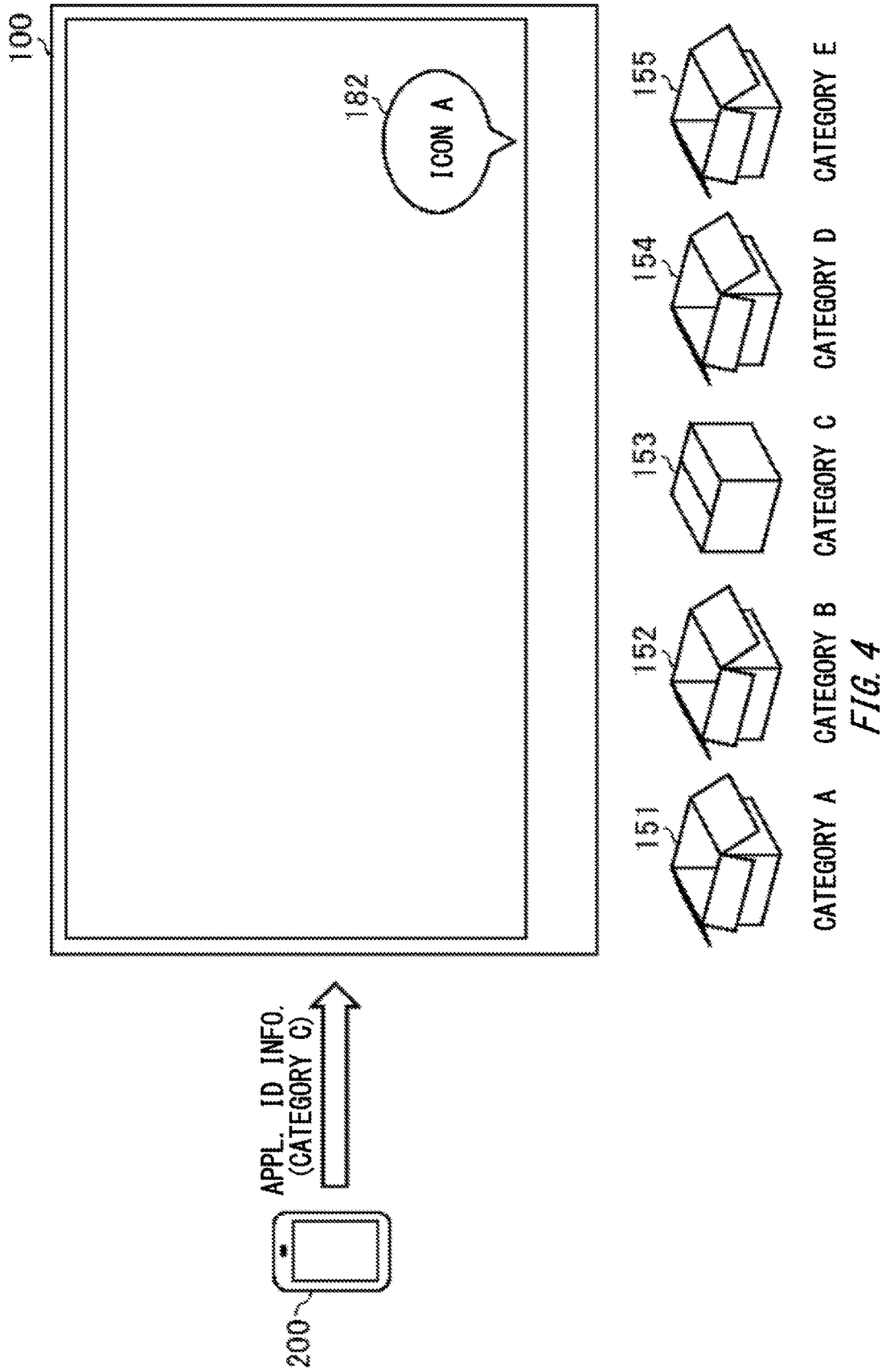
FIG. 4 schematically shows one example of the flow of processes performed by the system 10.

FIG. 4 exemplifies a process performed when the display apparatus 100 receives second application identification information corresponding to Category C. Since the display apparatus 100 is displaying the icon 182, it stores an output request in the queue 153 corresponding to Category C.

Figure 5:
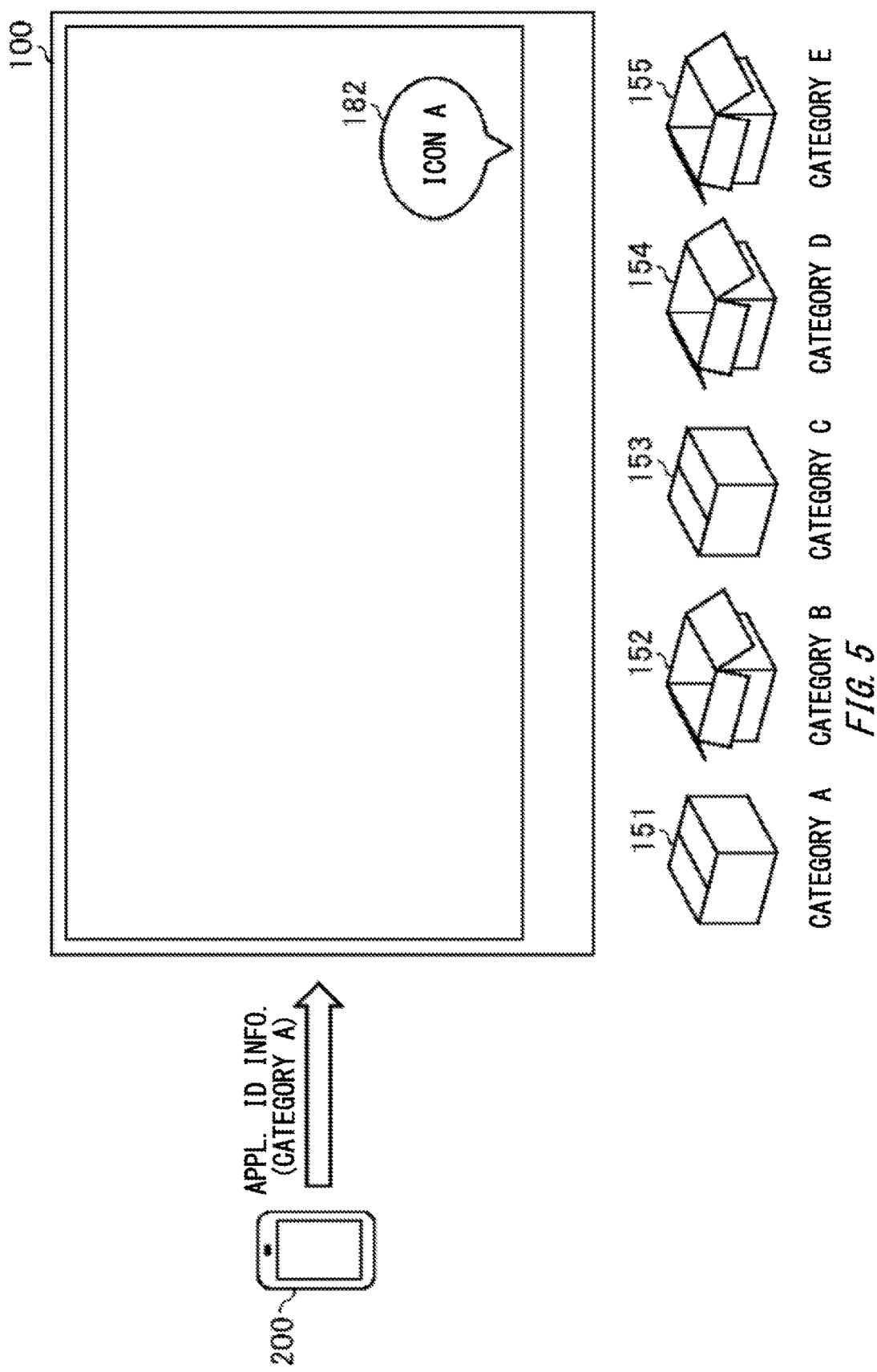
FIG. 5 schematically shows one example of the flow of processes by the system 10.

FIG. 5 exemplifies a process performed when the display apparatus 100 receives third application identification information corresponding to Category A. Since the display apparatus 100 is displaying the icon 182, it stores an output request in the queue 151 corresponding to Category A.

Figure 6:
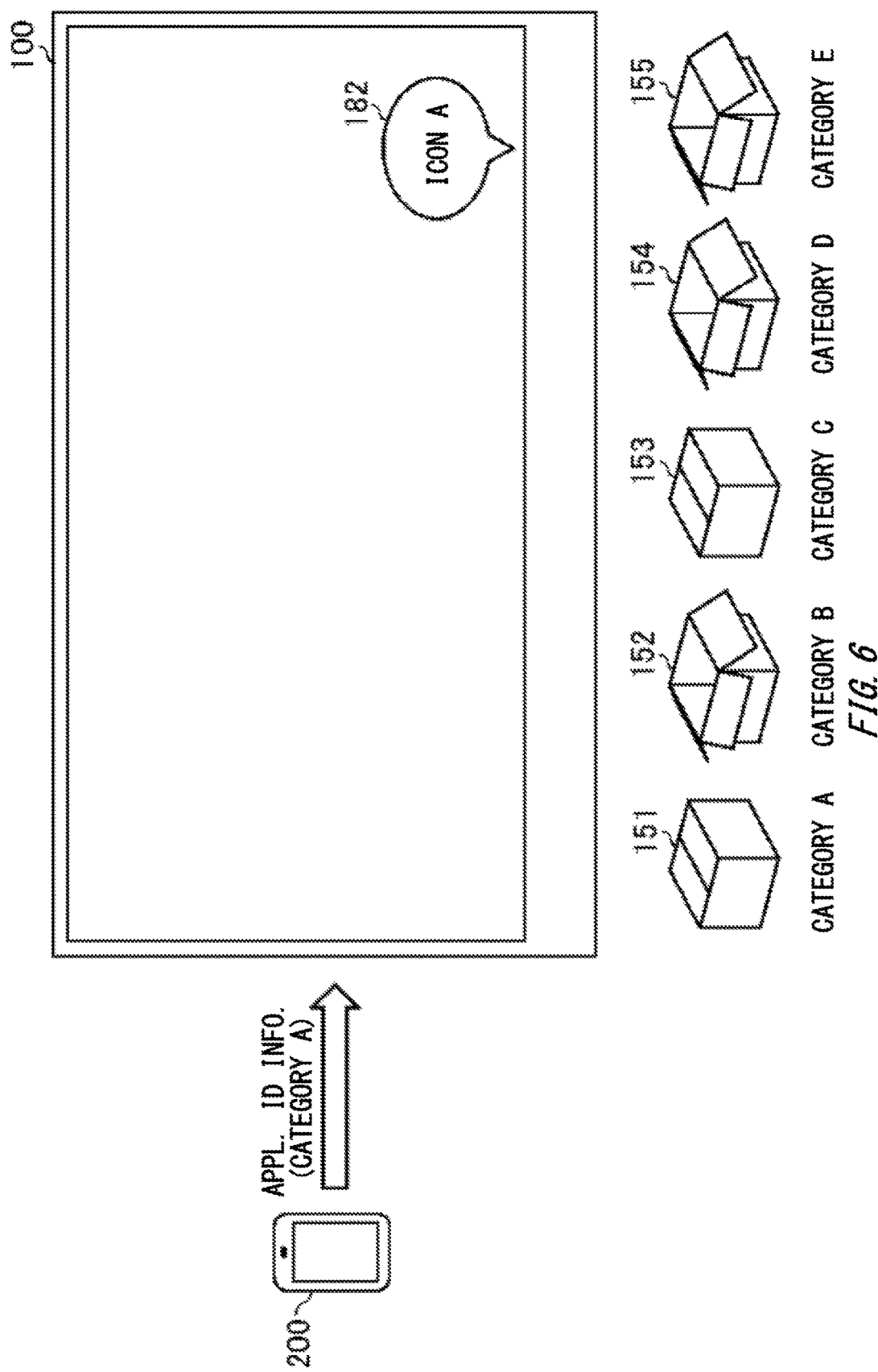
FIG. 6 schematically shows one example of the flow of processes performed by the system 10.

FIG. 6 exemplifies a process performed when the display apparatus 100 receives fourth application identification information corresponding to Category A. Since the display apparatus 100 is displaying the icon 182 and an output request is already stored in the queue 151, it ignores the fourth application identification information. That is, an output request is not stored for the fourth application identification information.

FIG. 7 exemplifies a process performed when displaying of the icon 182 ends. The display apparatus 100 reads out the output requests stored in the queues 151, 152, 153, 154, 155 according to the order in which they are stored therein, and displays an icon according to an output request read out. Here, since the output requests are stored in the queue 151 and queue 153, and the queue 153 stored the output request earlier, the display apparatus 100 reads out the output request stored in the queue 153 and displays an icon 184 corresponding to Category C. Then, after displaying of the icon 184 ends, the display apparatus 100 reads out the output request stored in the queue 151 and displays the icon 182 corresponding to Category A.

As mentioned above, the display apparatus 100 according to the present embodiment prevents an icon corresponding to the same category from being displayed more than the number of times necessary, by ignoring received application identification information when an output request is already stored in a queue corresponding to the category of the received application identification information.

Figure 8:
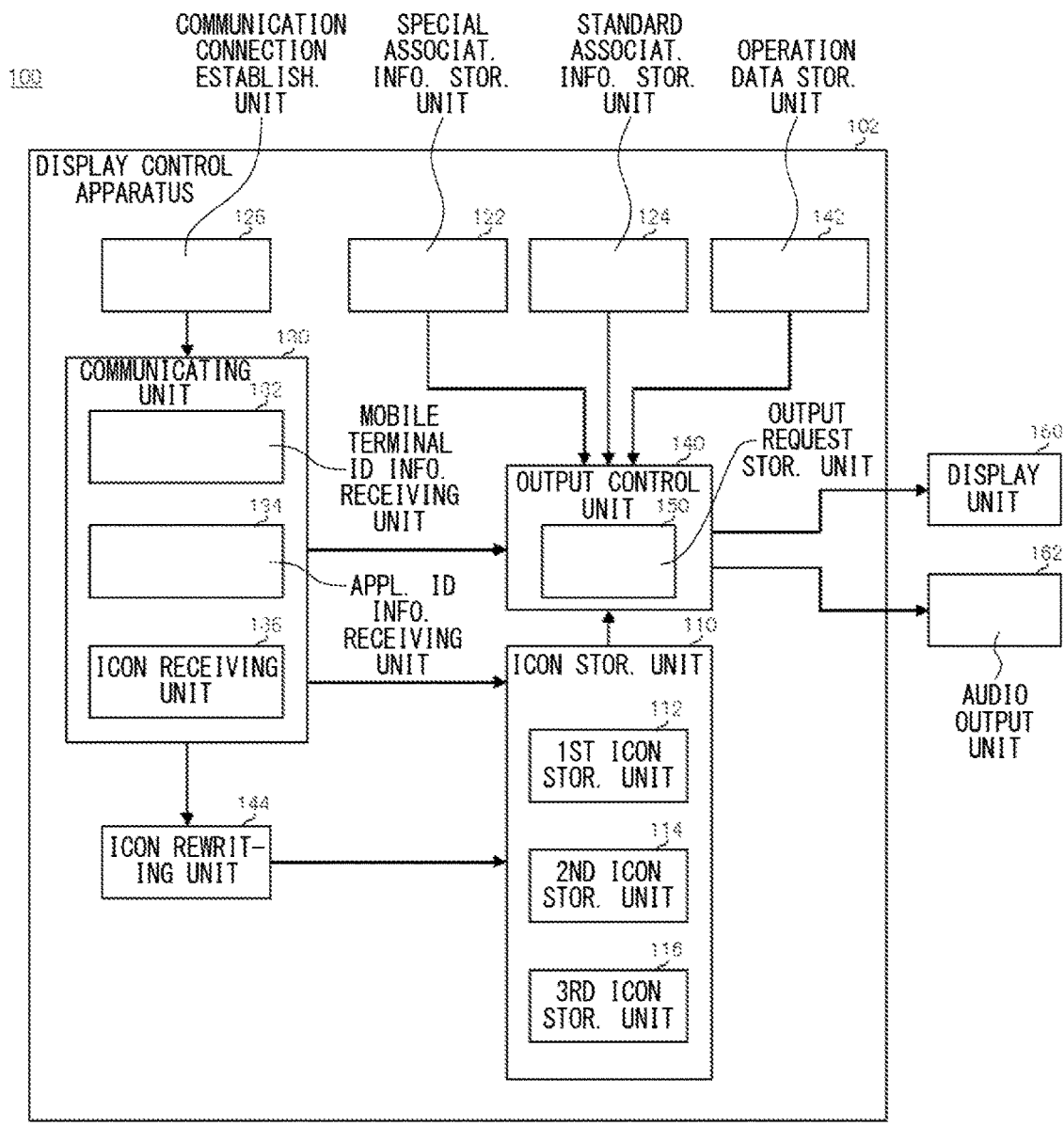
FIG. 8 schematically shows one example of the functional configuration of a display apparatus 100.

FIG. 8 schematically shows one example of the functional configuration of the display apparatus 100. The display apparatus 100 includes a display control apparatus 102, a display unit 160 and an audio output unit 162. The display control apparatus 102 has an icon storage unit 110, a special association information storage unit 122, a standard association information storage unit 124, a communication connection establishing unit 126, a communicating unit 130, an output control unit 140, an operation data storage unit 142 and an icon rewriting unit 144. It is not essential for the display control apparatus 102 to have the configurations of all of them.

The icon storage unit 110 stores standard icons and special icons. The icon storage unit 110 may be one example of a notification data storage unit. In the present embodiment, the icon storage unit 110 includes a first icon storage unit 112, a second icon storage unit 114 and a third icon storage unit 116.

The first icon storage unit 112 stores a standard icon. The standard icon stored in the first icon storage unit 112 is in some cases called a first icon. The first icon storage unit 112 may store a plurality of standard icons. The first icon storage unit 112 stores five standard icons, for example. Data stored in the first icon storage unit 112 may be unrewritable.

The second icon storage unit 114 and third icon storage unit 116 store special icons. The special icon stored in the second icon storage unit 114 is in some cases called a second icon. The special icon stored in the third icon storage unit 116 is in some cases called a third icon. The second icon storage unit 114 may store a plurality of special icons. The second icon storage unit 114 stores five special icons, for example. The third icon storage unit 116 may store a plurality of special icons. The third icon storage unit 116 stores five special icons, for example.

If both the second icon storage unit 114 and the third icon storage unit 116 store special icons, the icon storage unit 110 may manage a special icon stored in either of them as a valid special icon. The icon storage unit 110 may manage, as a valid special icon, either of the second icon or the third icon that was stored later. The icon storage unit 110 may prohibit handling, as a valid special icon, either of the second icon or the third icon that was stored earlier.

The special association information storage unit 122 stores a combination of mobile terminal identification information and application identification information in association with a special icon. The special association information storage unit 122 may store a combination of mobile terminal identification information and application identification information in association with a special icon, that is, either of the second icon or the third icon which was stored later. The special association information storage unit 122 may store each of the plurality of combinations of mobile terminal identification information and application identification information in association with each of the plurality of special icons. The special association information storage unit 122 may store a combination of mobile terminal identification information and category identification information identifying the category of an application in association with a special icon.

The standard association information storage unit 124 stores a combination of mobile terminal identification information and application identification information in association with a standard icon. The standard association information storage unit 124 may store each of the plurality of combinations of mobile terminal identification information and application identification information in association with each of the plurality of standard icons. The standard association information storage unit 124 may store a combination of mobile terminal identification information and category identification information in association with a standard icon.

The communication connection establishing unit 126 establishes communication connection with the mobile terminal 200. The communication connection establishing unit 126 may establish communication connection with the mobile terminal 200 according to any communication method. For example, the communication connection establishing unit 126 establishes BLE communication connection with the mobile terminal 200. Also, the communication connection establishing unit 126 may establish Bluetooth (registered trademark) communication connection with the mobile terminal 200. Also, the communication connection establishing unit 126 may establish communication connection with the mobile terminal 200 via a Wi-Fi (registered trademark) access point.

The communicating unit 130 communicates with the mobile terminal 200 via communication connection established by the communication connection establishing unit 126. The communicating unit 130 includes a mobile terminal identification information receiving unit 132, an application identification information receiving unit 134 and an icon receiving unit 136.

The mobile terminal identification information receiving unit 132 receives mobile terminal identification information from the mobile terminal 200. For example, the mobile terminal identification information receiving unit 132 receives, from the communication connection establishing unit 126, pairing information received from the mobile terminal 200 when the communication connection establishing unit 126 establishes BLE communication connection or Bluetooth (registered trademark) communication connection with the mobile terminal 200. Also, for example, the mobile terminal identification information receiving unit 132 receives, from the communication connection establishing unit 126, mobile terminal identification information received from the mobile terminal 200 when the communication connection establishing unit 126 establishes communication connection with the mobile terminal 200 according to another communication method. Also, for example, when a notification event occurred in the mobile terminal 200 and the mobile terminal 200 transmits mobile terminal identification information in addition to application identification information corresponding to the notification event, the mobile terminal identification information receiving unit 132 may receive the mobile terminal identification information.

The application identification information receiving unit 134 receives application identification information from the mobile terminal 200. The application identification information receiving unit 134 may receive application identification information that: was transmitted by the mobile terminal 200 when a notification event occurred in the mobile terminal 200; and corresponds to the notification event that occurred. The application identification information receiving unit 134 is one example of information receiving unit.

The icon receiving unit 136 receives an icon. The icon receiving unit 136 receives a special icon from the mobile terminal 200, for example. For example, after completion of a procedure to purchase a new special icon, the mobile terminal 200 transmits the new special icon to the display apparatus 100.

The output control unit 140 causes the display unit 160 to display an icon. The output control unit 140 may cause the display unit 160 to display a standard icon or special icon. The output control unit 140 may cause the display unit 160 to display a plurality of icons for the same output time. For example, the output control unit 140 sets the display time for each of the plurality of icons to five seconds.

If sound data is included in a standard icon or special icon, the output control unit 140 causes the audio output unit 162 to audio-output the sound data. The output control unit 140 may be one example of a notification data output unit.

If a combination of mobile terminal identification information received by the mobile terminal identification information receiving unit 132 and application identification information received by the application identification information receiving unit 134 is stored in the special association information storage unit 122, the output control unit 140 causes the display unit 160 to display a special icon corresponding to the combination. Also, if a combination of mobile terminal identification information received by the mobile terminal identification information receiving unit 132 and application identification information received by the application identification information receiving unit 134 is not stored in the special association information storage unit 122, but is stored in the standard association information storage unit 124, the output control unit 140 causes the display unit 160 to display a standard icon corresponding to the combination. If a combination of mobile terminal identification information received by the mobile terminal identification information receiving unit 132 and application identification information received by the application identification information receiving unit 134 is stored in none of the special association information storage unit 122 and the standard association information storage unit 124, the output control unit 140 may cause the display unit 160 to display one preset standard icon.

If the special association information storage unit 122 stores a combination of mobile terminal identification information and category identification information in association with a special icon and the standard association information storage unit 124 stores a combination of mobile terminal identification information and category identification information in association with a standard icon, and additionally if a combination of received mobile terminal identification information and category identification information of the category of an application identified with received application identification information is stored in the special association information storage unit 122, the output control unit 140 may cause the display unit 160 to display a special icon corresponding to the combination as a special icon corresponding to the received application identification information. Also, if a combination of received mobile terminal identification information and category identification information of the category of an application identified with received application identification information is not stored in the special association information storage unit 122, but is stored in the standard association information storage unit 124, the output control unit 140 may cause the display unit 160 to display a standard icon corresponding to the combination as a standard icon corresponding to the received application identification information.

When the application identification information receiving unit 134 receives application identification information, the output control unit 140 makes different output control for an icon corresponding to the received application identification information, depending on whether or not the output queue count for an icon corresponding to the received application identification information is smaller than a predetermined number. The predetermined number may be for example the number of output requests that a queue can store, which is explained with reference to FIG. 3 to FIG. 7. If the output queue count for an icon corresponding to received application identification information is smaller than the predetermined number, the output control unit 140 may put an icon corresponding to the received application identification information in a queue so as to be displayed on the display unit 160. If the output queue count for an icon corresponding to received application identification information is not smaller than the predetermined number, the output control unit 140 may perform control such that an icon corresponding to the received application identification information is not output by the display unit 160.

The predetermined number is one, for example. Thereby, for example, it becomes possible to suppress output of each icon to once, when the display apparatus 100 receives application identification information from the mobile terminal 200 consecutively. Also, the predetermined number may be two or larger, and may be able to be set by a user. Thereby, for example, it becomes possible to suppress output of each icon to a number of times as desired by a user, when the display apparatus 100 receives application identification information from the mobile terminal 200 consecutively.

The output control unit 140 has an output request storage unit 150. The output request storage unit 150 has a plurality of queues that can store a predetermined number of output requests to output icons. The number of output requests to be stored in a queue is one example of the output queue count for an icon corresponding to the queue. The output control unit 140 causes the display unit 160 to display an icon according to the order in which output requests are stored in a queue, and deletes, from the queue, output requests for which icons were displayed. When determining the icon output order, the output control unit 140 may not follow the order in which output requests are stored in a queue. For example, it may be a random order. Also, an order may be preset for a plurality of queues, and the output control unit 140 may output icons according to the order.

When the output queue count for an icon corresponding to application identification information received by the application identification information receiving unit 134 is not smaller than a predetermined number, after output of icons in an output queue, the output control unit 140 may cause the display unit 160 to output the icon corresponding to the received application identification information for output time which is shorter than that in a case where the output queue count for the icon corresponding to the received application identification information is smaller than the predetermined number. Thereby, it becomes possible to reduce icon output time when the number of times of output of an icon for the same category is not smaller than the predetermined number.

The operation data storage unit 142 stores operation data indicating how an icon is to be displayed on the display unit 160. The operation data may indicate a given motion. For example, the operation data indicates a motion such as fade-in, slide-in, float-in, split or wipe. The operation data storage unit 142 may store operation data for each of the plurality of special icons. Also, the operation data storage unit 142 may store operation data for each of the plurality of standard icons. If operation data corresponding to an icon to be displayed on the display unit 160 is stored in the operation data storage unit 142, the output control unit 140 may cause the icon to be displayed according to the operation data.

The icon rewriting unit 144 rewrites a special icon stored in the icon storage unit 110. When the icon receiving unit 136 receives a plurality of new special icons in a state where a plurality of second icons are stored in the second icon storage unit 114 and a plurality of third icons are stored in the third icon storage unit 116 for example, the icon rewriting unit 144 rewrites either of the plurality of second icons or the plurality of third icons that were stored earlier with the newly received plurality of special icons. When rewriting by the icon rewriting unit 144 is executed, the special association information storage unit 122 may change association of a combination of mobile terminal identification information and application identification information to a special icon after the rewriting.

Figure 9:
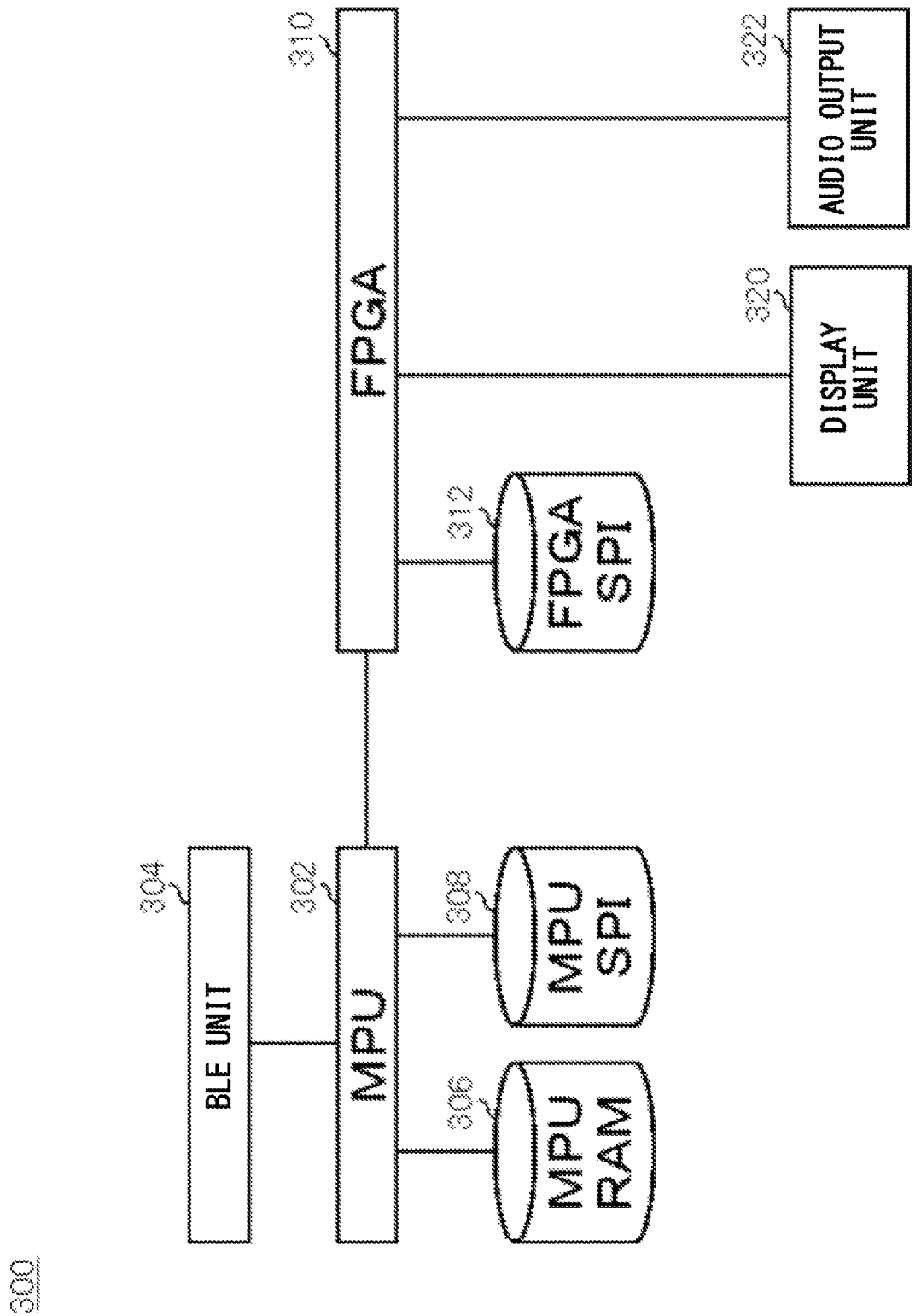
FIG. 9 schematically shows the configuration of a monitor 300 which is an implementation example of the display apparatus 100.

FIG. 9 schematically shows the configuration of a monitor 300 which is an implementation example of the display apparatus 100. The monitor 300 includes an MPU (Micro Processing Unit) 302, a BLE unit 304, an MPU-RAM (Random Access Memory) 306, an MPU-SPI (Serial Peripheral Interface) storage 308, an FPGA (Field Programmable Gate Array) 310, an FPGA-SPI storage 312, a display unit 320 and an audio output unit 322.

The MPU 302 controls operation of the entire monitor 300. The BLE unit 304 controls BLE communication. The BLE unit 304 may be one example of the communication connection establishing unit 126 and communicating unit 130.

The MPU-RAM 306 stores application identification information that the BLE unit 304 received from the mobile terminal 200. The MPU-SPI storage 308 may be one example of the special association information storage unit 122 and standard association information storage unit 124.

The FPGA 310 may be one example of the output control unit 140. The FPGA-SPI storage 312 may be one example of the icon storage unit 110. The FPGA-SPI storage 312 may store each of the plurality of icons in association with icon identification information identifying the icon. Also, the FPGA-SPI storage 312 may be one example of the output request storage unit 150. The FPGA-SPI storage 312 may have a plurality of queues that can store a predetermined number of output requests to output icons.

The display unit 320 may be one example of the display unit 160. The audio output unit 322 may be one example of the audio output unit 162.

Upon reception, by the BLE unit 304, of application identification information from the mobile terminal 200, the MPU 302 judges whether or not a combination of mobile terminal identification information of the mobile terminal 200 and the received application identification information is stored in the MPU-SPI storage 308. If the combination of the mobile terminal identification information and the application identification information is associated with a special icon, the MPU 302 reads out icon identification information of the special icon from the MPU-SPI storage 308.

Also, if the combination of the mobile terminal identification information and the application identification information is not associated with a special icon, but the combination is associated with a standard icon, the MPU 302 reads out icon identification information of the standard icon from the MPU-SPI storage 308. Then, the MPU 302 transmits the icon identification information read out to the FPGA 310.

The FPGA 310 reads out, from the FPGA-SPI storage 312, an icon corresponding to the icon identification information received from the MPU 302. Then, the FPGA 310 causes the display unit 320 to display the icon read out. Also, if the icon read out includes sound data, the FPGA 310 causes the audio output unit 322 to output the sound data.

Figure 10:
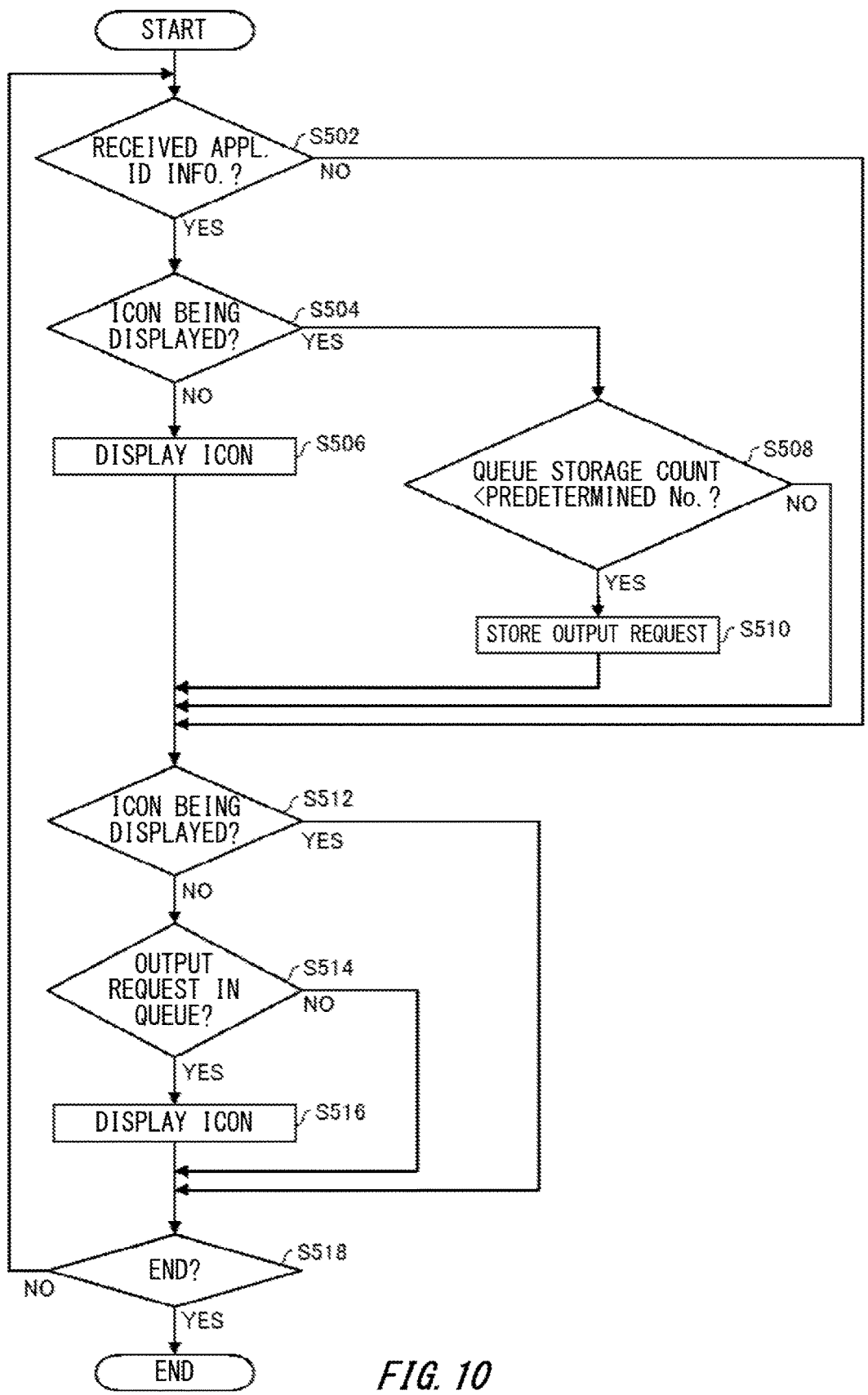
FIG. 10 schematically shows one example of the flow of processes performed by the display apparatus 100.

FIG. 10 schematically shows one example of the flow of processes performed by the display apparatus 100. In the processes shown in FIG. 10 explained, the state where BLE communication connection between the display apparatus 100 and the mobile terminal 200 is established is the starting state. The respective processes shown in FIG. 10 are executed by a control unit provided to the display apparatus 100 acting as the main agent.

At Step (steps are in some cases abbreviated to Ss) 502, the application identification information receiving unit 134 judges whether or not application identification information is received from the mobile terminal 200. If YES, the process proceeds to S504, and if NO, the process proceeds to S512.

At S504, it is judged whether or not an icon stored in the icon storage unit 110 is being displayed on the display unit 160. If NO, the process proceeds to S506, and if YES, the process proceeds to S508. At S506, the output control unit 140 causes the display unit 160 to display an icon corresponding to the application identification information received at S502.

At S508, it is judged whether or not the number of output requests stored in a queue corresponding to the icon corresponding to the application identification information received at S502 is smaller than a predetermined number. If YES, the process proceeds to S510, and if NO, the process proceeds to S512. At S510, an output request is stored in the queue corresponding to the icon corresponding to the application identification information received at S502.

At S512, it is judged whether or not an icon stored in the icon storage unit 110 is being displayed on the display unit 160. If NO, the process proceeds to S514, and if YES, the process proceeds to S518.

At S514, it is judged whether or not an output request is stored in a queue. If YES, the process proceeds to S516, and if NO, the process proceeds to S518. At S516, the output control unit 140 causes the display unit 160 to display an icon according to an output request which was stored earliest among the output requests stored in the queue.

At S518, it is judged whether or not an instruction to end the process is received. If NO, the process returns to S502, and if YES, the process ends.

Although in the above-mentioned embodiment explained, application identification information is taken as one example of information that the display apparatus 100 receives from the mobile terminal 200, this is not the sole example.

Information that the display apparatus 100 receives from the mobile terminal 200 may be category identification information identifying the category of an application. In this case, the output control unit 140 may cause an icon corresponding to application identification information of an application of the category indicated by the category identification information received by the information receiving unit to be output as an icon corresponding to the category identification information received by the information receiving unit. Also, if the special association information storage unit 122 stores a combination of mobile terminal identification information and category identification information in association with a special icon and the standard association information storage unit 124 stores a combination of mobile terminal identification information and category identification information in association with a standard icon, the output control unit 140 may cause an icon corresponding to category identification information received by the information receiving unit to be output. When the information receiving unit receives category identification information, the output control unit 140 may make different output control for an icon corresponding to the received category identification information, depending on whether or not the output queue count for an icon corresponding to the received category identification information is smaller than a predetermined number.

Also, information that the display apparatus 100 receives from the mobile terminal 200 may be event identification information identifying a notification event occurred in the mobile terminal 200. In this case, the output control unit 140 may cause an icon corresponding to application identification information of an application in which an event indicated by the event identification information received by the information receiving unit is occurring to be output as an icon corresponding to the event identification information received by the information receiving unit. Also, in this case, the special association information storage unit 122 may store a combination of mobile terminal identification information and event identification information in association with a special icon, the standard association information storage unit 124 may store a combination of mobile terminal identification information and event identification information in association with a standard icon, and the output control unit 140 may cause an icon corresponding to event identification information received by the information receiving unit to be output. When the information receiving unit receives event identification information, the output control unit 140 may make different output control for an icon corresponding to the received event identification information, depending on whether or not the output queue count for an icon corresponding to the received event identification information is smaller than a predetermined number.

Also, although in the above-mentioned embodiment mainly explained, an icon is used as one example of notification data, this is not the sole example. The notification data may be at least any of an image, text and sound. If notification data is an image or text, the output control unit 140 causes the display unit 160 to display the notification data. If the notification data is sound, the output control unit 140 causes the audio output unit 162 to audio-output the notification data.

Also, although in the embodiment explained, a communication device is taken as an example of the mobile terminal 200, this is not the sole example, and it may be a device other than the mobile terminal 200 as long as an application can be installed thereon and it is a device having a communication function.

In the explanation above, the respective units of the display apparatus 100 may be realized by hardware or may be realized by software. Also, they may be realized by combinations of hardware and software. Also, execution of programs may cause a computer to function as the display apparatus 100. The programs may be installed, from a computer-readable medium or a storage apparatus connected to a network, on a computer that constitutes at least a part of the display apparatus 100.

The programs that are installed on the computer and cause the computer to function as the display apparatus 100 according to the present embodiment may act on a CPU or the like to respectively cause the computer to function as the respective units of the display apparatus 100. Information processing described in these programs is read in by the computer to function as a specific means realized by cooperation between software and hardware resources of the display apparatus 100.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: system; 20: network; 30: store server; 40: cloud server; 50: radio base station; 100: display apparatus; 102: display control apparatus; 110: icon storage unit; 112: first icon storage unit; 114: second icon storage unit; 116: third icon storage unit; 122: special association information storage unit; 124: standard association information storage unit; 126: communication connection establishing unit; 130: communicating unit; 132: mobile terminal identification information receiving unit; 134: application identification information receiving unit; 136: icon receiving unit; 140: output control unit; 142: operation data storage unit; 144: icon rewriting unit; 150: output request storage unit; 151: queue; 152: queue; 153: queue; 154: queue; 155: queue; 160: display unit; 162: audio output unit; 180: icon; 182: icon; 184: icon; 200: mobile terminal; 300: monitor; 302: MPU; 304: BLE unit; 306: MPU-RAM; 308: MPU-SPI storage; 310: FPGA; 312: FPGA-SPI storage; 320: display unit

What is claimed is:

1. An output control apparatus comprising:
  a processor;
  a controller connected to the processor;
  a processor storage that is connected to the processor and stores a combination of a communication device identification information and at least one application identification information, associated with notification data;
  a receiver that is connected to the processor and receives application identification information along with the communication device identification information from communication device;

a controller storage that is connected to the controller and stores the notification data associated with the application identification information; and a display/audio output device connected to the controller; wherein upon reception, by the receiver, of the application identification information from the communication device, the processor judges whether or not the combination of the received communication device identification information and the received application identification information is stored in the processor storage, and if the combination is stored, the processor reads out the corresponding application identification information from the processor storage and transmits the corresponding application identification information to the controller;

the controller reads out the notification data corresponding to the application identification information received by the processor;

the controller makes different output control for the notification data corresponding to the application identification information received from the processor, depending on a decision by the processor regarding whether or not an output queue count for the notification data corresponding to the received application identification information is smaller than a predetermined number;

the application identification information is application identification information of an application, among applications installed on the communication device, in which a notification event has occurred, when the receiver receives the application identification information, the controller makes different output control for the notification data corresponding to the received application identification information, depending on a decision by the processor regarding whether or not an output queue count for the notification data corresponding to a category of an application which is identified by the application identification information that is read out from the processor storage is smaller than the predetermined number;

when the output queue count for the notification data corresponding to the application identification information read out from the processor storage is smaller than the predetermined number, the controller puts the notification data corresponding to the received information in a queue so as to be output sequentially by the display/audio output device;

when the output queue count for the notification data corresponding to the application identification information read out from the processor storage is not smaller than the predetermined number, the controller performs control so as not to output the notification data corresponding to the received application identification information; and the display/audio output device sequentially outputs the notification data corresponding to the application data information read out from the processor storage in accordance with instructions from the controller.

2. The output control apparatus according to claim 1, wherein when the output queue count for the notification data corresponding to the application identification information read out from the processor storage is not smaller than the predetermined number, after output of the notification data in an output queue, the controller causes the display/audio output device to output sequentially the notification data corresponding to the application identification information read out from the processor storage for output time shorter than that in a case where the output queue count for notification data corresponding to the application identification information read out from the processor storage is smaller than the predetermined number.

3. The output control apparatus according to claim 1, wherein the controller storage has a queue for each type of the information that can store the predetermined number of output requests to output the notification data for each type of the application identification information, and the controller causes the display/audio output device to sequentially output the notification data according to an order in which the output requests are stored in the queue and deletes the output requests from the queue.

4. The output control apparatus according to claim 1, wherein the notification data is at least any of an icon, an image, text and sound.

5. A system comprising:
the output control apparatus according to claim 1; and
the communication device.

6. The output control apparatus according to claim 1, wherein
the controller storage has a queue for each type of the information that can store the predetermined number of output requests to output the notification data for each type of the application identification information, and
if a plurality of output requests are stored in the queues, the controller outputs only one notification data from among a plurality of notification data corresponding to the plurality of output requests.

7. The output control apparatus according to claim 1, further comprising: a memory that is connected to the processor and stores the application identification information, received by the receiver from the communication device.

8. An output control apparatus comprising:
a processor;
a field programmable gate array (FPGA) connected to the processor;
a processor storage that is connected to the processor and stores a combination of a communication device identification information and at least one application identification information, associated with notification data; and
a BLE unit that is connected to the processor and receives application identification information along with the communication device identification information from communication device;
a FPGA storage that is connected to the FPGA and stores the notification data associated with the application identification information; and
a display/audio output device connected to the FPGA; wherein
upon reception, by the BLE unit, of the application identification information from the communication device, the processor judges whether or not the combination of the received communication device identification information and the received application identification information is stored in the processor storage, and if the combination is stored, the processor reads out the corresponding application identification information from the processor storage and transmits the corresponding application identification information to the FPGA;
the FPGA reads out the notification data corresponding to the application identification information received by the processor;

the FPGA makes different output control for the notification data corresponding to the application identification information received from the processor, depending on a decision by the processor regarding whether or not an output queue count for the notification data corresponding to the received application identification information is smaller than a predetermined number;

the application identification information is application identification information of an application, among applications installed on the communication device, in which a notification event has occurred, when the BLE unit receives the application identification information, the FPGA makes different output control for the notification data corresponding to the received application identification information, depending on a decision by the processor regarding whether or not an output queue count for the notification data corresponding to a category of an application which is identified by the application identification information that is read out from the processor storage is smaller than the predetermined number;

when the output queue count for the notification data corresponding to the application identification information read out from the processor storage is smaller than the predetermined number, the FPGA puts the notification data corresponding to the received information in a queue so as to be output sequentially by the display/audio output device;

when the output queue count for the notification data corresponding to the application identification information read out from the processor storage is not smaller than the predetermined number, the FPGA performs control so as not to output the notification data corresponding to the received application identification information; and the display/audio output device sequentially outputs the notification data corresponding to the application data information read out from the processor storage in accordance with instructions from the FPGA.

* * * * *